(12) United States Patent
Flixeder et al.

(10) Patent No.: US 12,476,527 B2
(45) Date of Patent: Nov. 18, 2025

(54) TRANSPORT DEVICE

(71) Applicant: B&R Industrial Automation GmbH, Eggelsberg (AT)

(72) Inventors: Stefan Flixeder, Eggelsberg (AT); Michael Hauer, Eggelsberg (AT); Martin Haudum, Eggelsberg (AT)

(73) Assignee: B&R Industrial Automation GmbH, Eggelsberg (AT)

( * ) Notice: Subject to any disclaimer, the term of this patent is extended or adjusted under 35 U.S.C. 154(b) by 521 days.

(21) Appl. No.: 17/780,431

(22) PCT Filed: Nov. 25, 2020

(86) PCT No.: PCT/EP2020/083291
§ 371 (c)(1),
(2) Date: May 26, 2022

(87) PCT Pub. No.: WO2021/105166
PCT Pub. Date: Jun. 3, 2021

(65) Prior Publication Data
US 2023/0006529 A1    Jan. 5, 2023

(30) Foreign Application Priority Data

Nov. 27, 2019    (AT) .............................. A 51034/2019

(51) Int. Cl.
*H02P 5/46* (2006.01)
*H02K 41/03* (2006.01)
*H02P 25/064* (2016.01)

(52) U.S. Cl.
CPC ......... *H02K 41/031* (2013.01); *H02P 25/064* (2016.02); *H02K 2201/18* (2013.01)

(58) Field of Classification Search
CPC ........ H02P 25/06; H02P 25/064; H02P 6/006; H02P 6/16; H02P 6/182; H02P 25/22;
(Continued)

(56) References Cited

U.S. PATENT DOCUMENTS 9,202,719 B2   12/2015   Lu et al.
9,828,192 B2   11/2017   Baechle et al.
(Continued)

FOREIGN PATENT DOCUMENTS

DE   102015209618 A1   12/2016
WO   20180176137 A1   10/2018

OTHER PUBLICATIONS

J.M.M., Rovers, et al, 2013. Design and measurements of the Double Layer Planar Motor. In: International Electric Machines & Drives Conference. Chicago, May 12-15, 2013. IEEE.
(Continued)

*Primary Examiner* — Kawing Chan
*Assistant Examiner* — Charles S Laughlin
(74) *Attorney, Agent, or Firm* — Dykema Gossett PLLC

(57) ABSTRACT

Various aspects of the present disclosure are directed to a transport device in the form of a planar motor. In one embodiment, the transport device includes at least one transport segment, first and second coil groups, frive magnets and a control unit. The at least one transport segment forms a transport plane and includes at least one transport unit that moves in the transport plane at least two-dimensionally along two main movement directions. The first coil group, which defines the first main movement direction and has first drive coils, is arranged on the at least one transport segment. The second coil group defines the second main movement direction and has second drive coils is arranged on the at least one transport segment. The drive magnets are arranged on the at least one transport unit. The control unit controls the first drive coils, and the second drive coils.

18 Claims, 8 Drawing Sheets

(58) Field of Classification Search
CPC .... H02P 6/10; H02P 21/22; H02P 6/18; H02P 23/14; H02P 27/08; H02P 27/06; H02P 6/08; H02P 6/14; H02P 6/185; H02P 6/20; H02P 6/28; H02P 2207/05; H02P 21/18; H02P 6/15; H02P 25/032; H02P 25/03; H02P 2209/07; H02P 25/188; H02P 6/17; H02P 21/141; H02P 25/062; H02P 29/032; H02P 21/06; H02P 6/22; H02P 25/08; H02P 31/00; H02P 3/22; H02P 6/12

See application file for complete search history.

(56) References Cited

U.S. PATENT DOCUMENTS

| | | | |
|---|---|---|---|
| 9,878,813 | B2 | 1/2018 | Eberhardt et al. |
| 2016/0380562 | A1* | 12/2016 | Weber ............... B60L 13/003 310/12.11 |
| 2017/0179805 | A1 | 6/2017 | Lu |
| 2019/0348898 | A1 | 11/2019 | Frangen |
| 2020/0180872 | A1* | 6/2020 | Davidson ............... B65G 54/02 |
| 2020/0244149 | A1* | 7/2020 | Selnes ................... H02K 15/02 |
| 2021/0203255 | A1* | 7/2021 | Marzano ............... H02P 25/064 |

OTHER PUBLICATIONS

Jansen J W et al., "Magnetically Levitated Planar Actuator With Moving Magnets"; IEEE Transactions on Industry Applications, vol. 44, No. 4, Jul./Aug. 2008, p. 1108-1115, DOI: 10.1109/TIA. 2008.926065.

* cited by examiner

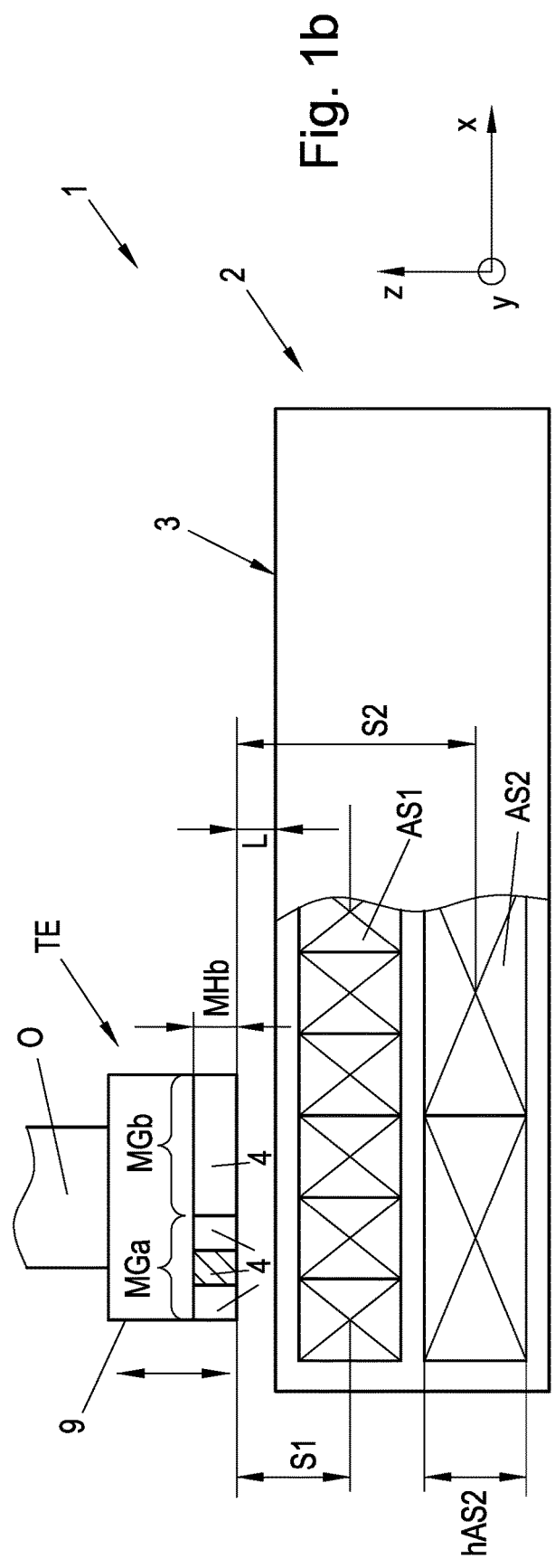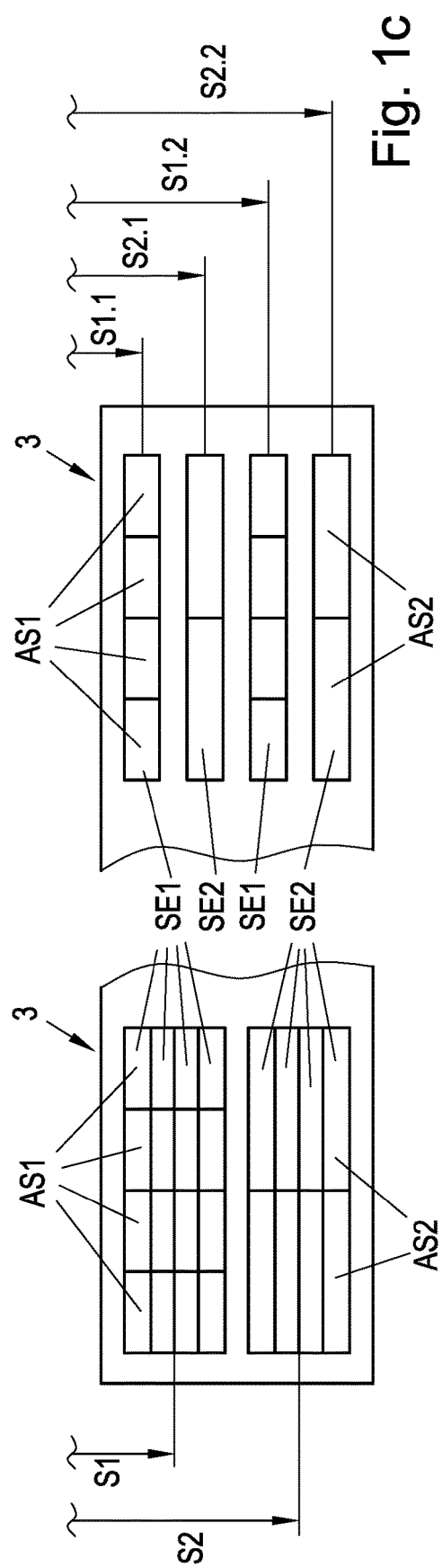

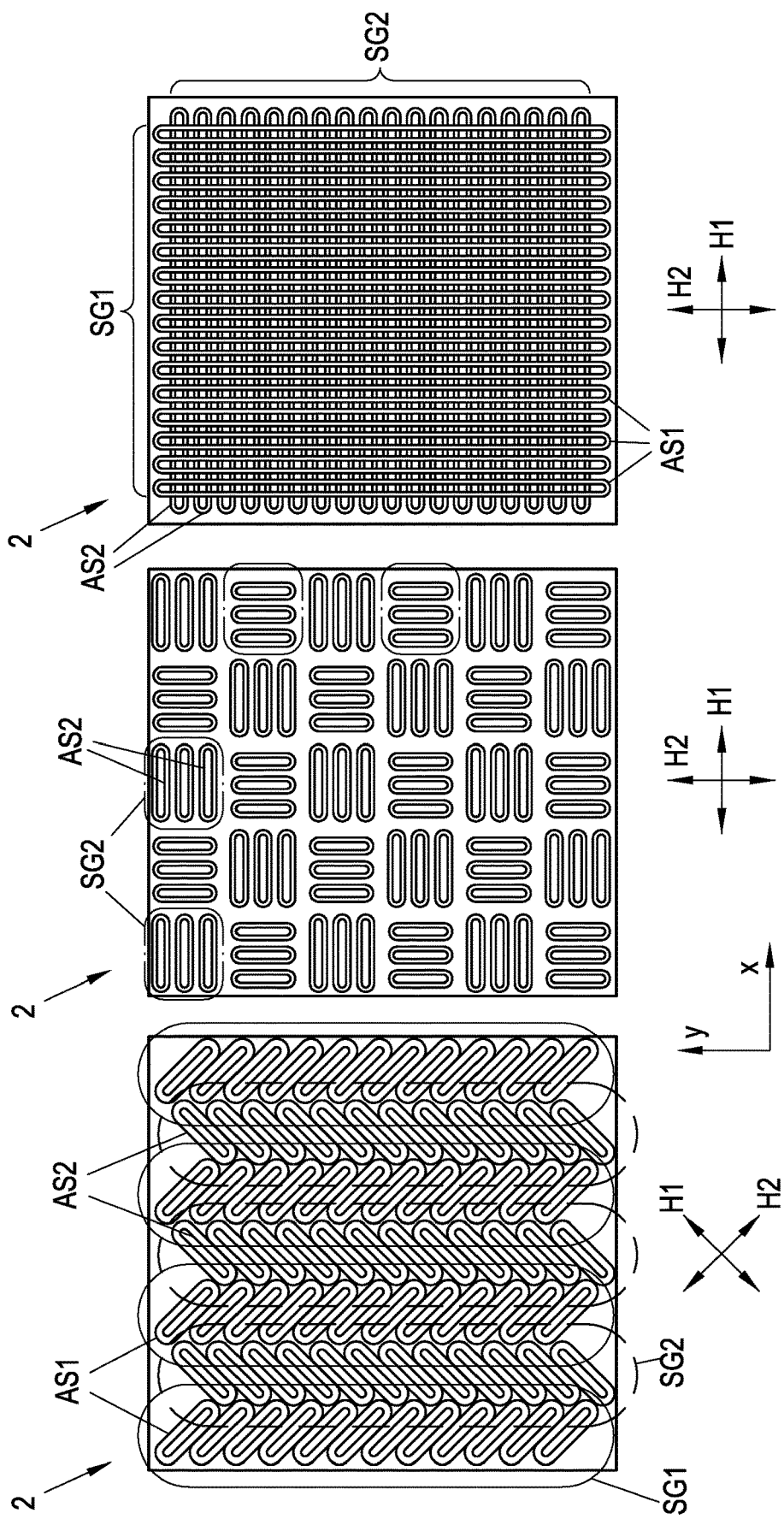

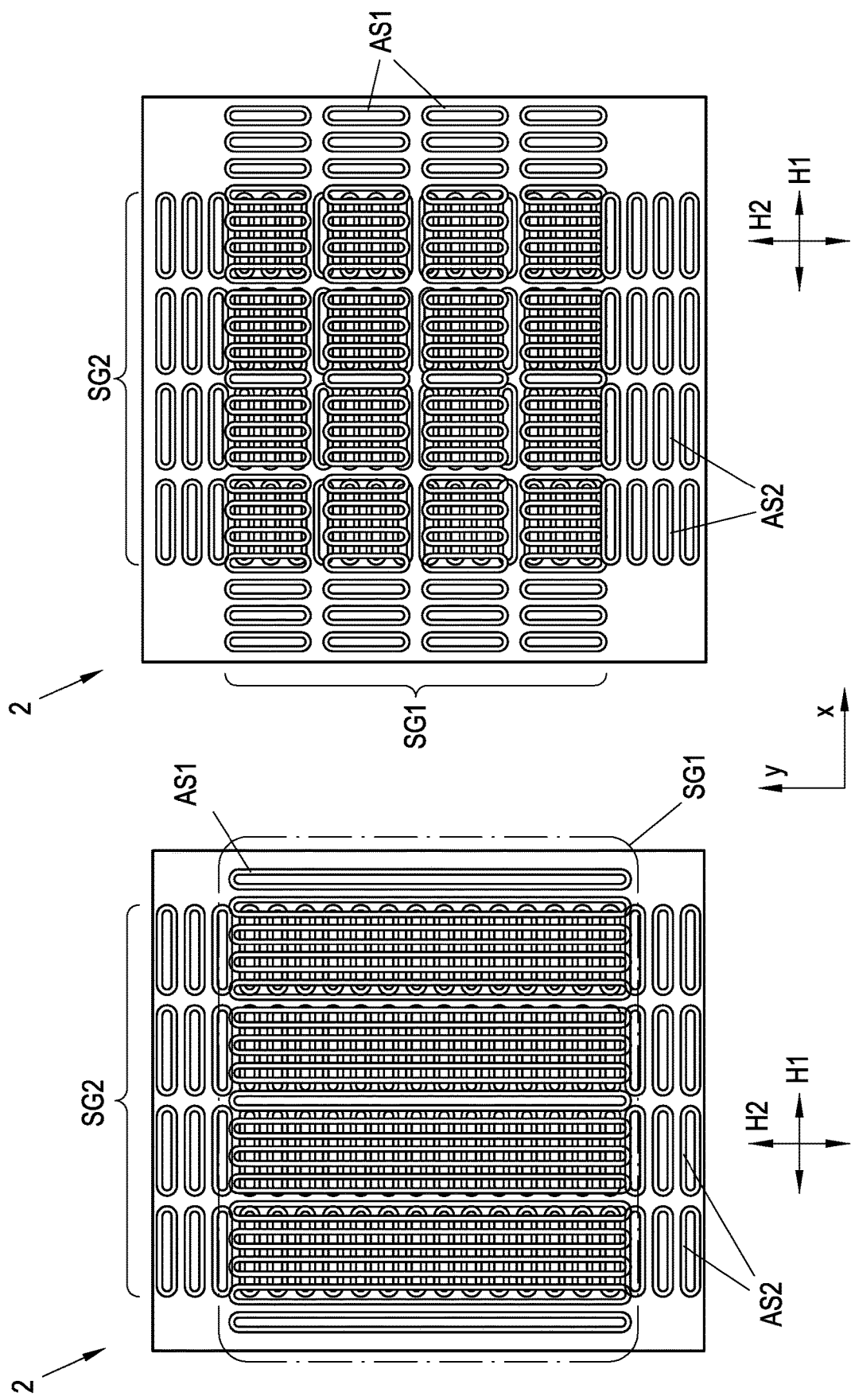

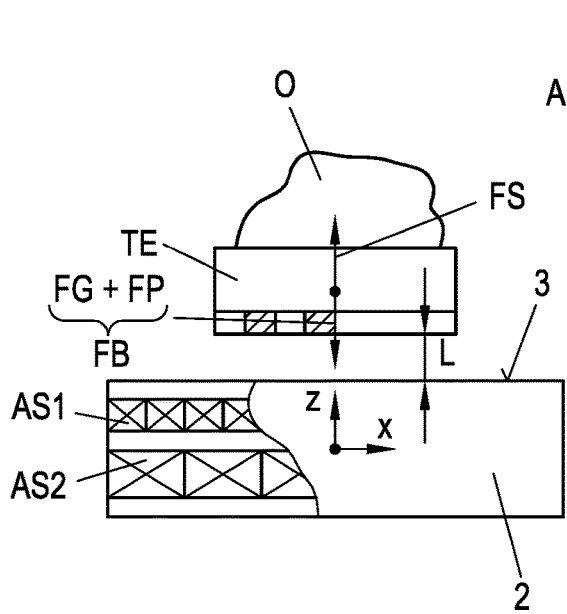 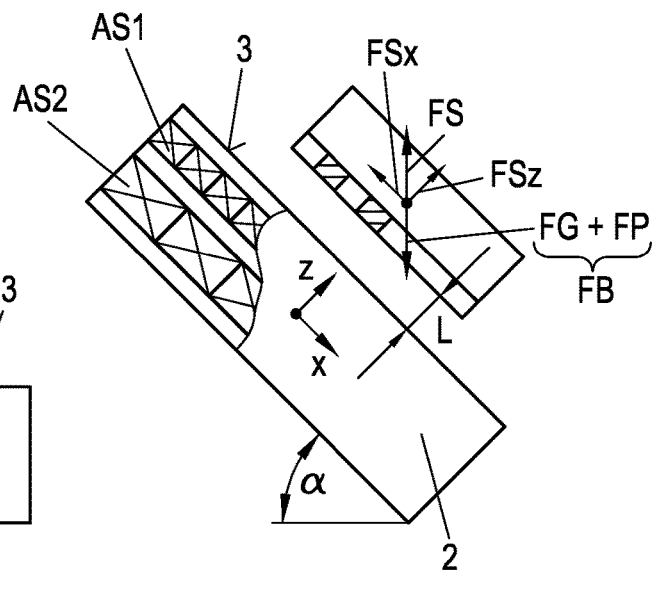
Fig. 5a  Fig. 5b
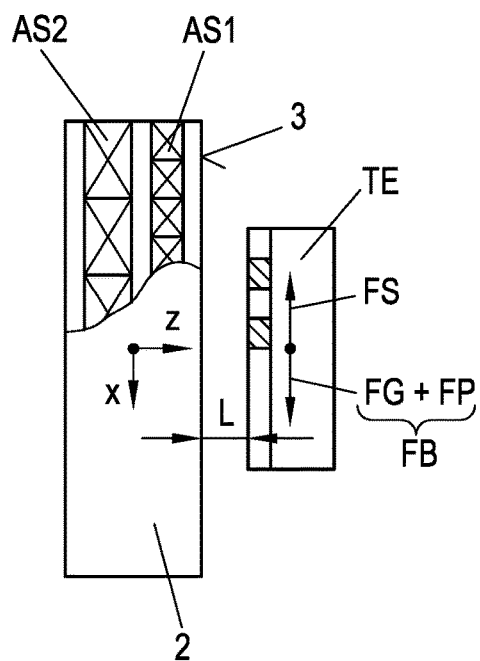 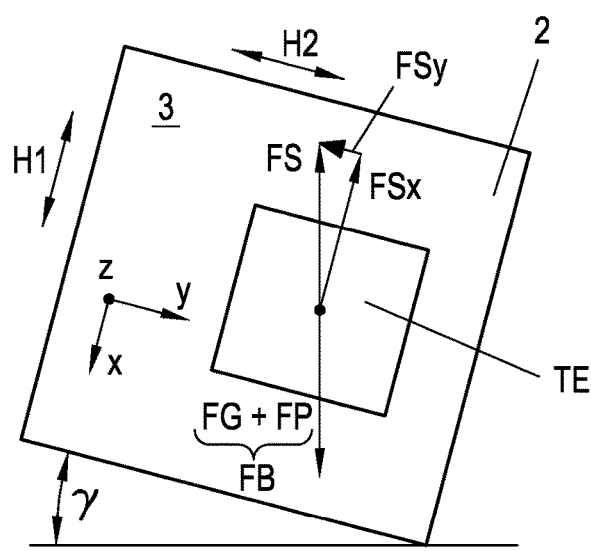
Fig. 5c  Fig. 5d ns. These components are frequently called drive magnets. Depending on the embodiment of the planar motor, they can also be arranged both on the transport unit and on the transport segment. Due to the simpler control, the drive coils are often arranged on the transport segment of the planar motor and the drive magnets are arranged on the transport unit.

The drive coils are usually controlled by a control unit in order to generate a moving magnetic field in the desired movement direction. The drive magnets, which interact with the moving magnetic field, are distributed at least two-dimensionally on the transport unit, so that a driving and levitation force can be generated on the transport unit. Due to the levitation force, the transport unit can be held in a constant position, e.g., an air gap can be created or adjusted and maintained between the transport unit and the transport segments. The additionally acting driving force can be used to move the transport unit in the desired movement direction and tilting forces or tilting moments can be generated. In order to make possible the two-dimensional movement of the transport unit, which is characteristic of the planar motor, a two-dimensional interaction of the magnetic fields of the transport segments and the transport units is required, wherein one of the two magnetic fields must be temporally changeable in at least two dimensions or both magnetic fields must be temporally changeable in at least one dimension (complementary to the respective other dimension). The drive coils and the drive magnets are advantageously arranged such that, in addition to a one-dimensional movement along the axes spanned by the transport plane, more complex two-dimensional movements of the transport unit in the transport plane are also possible.

A planar motor can be used, for example, as a transport device in a production process, wherein very flexible transport processes with complex movement profiles can be realized. In EP 3 172 156 B1 and EP 3 172 134 B1, for example, such applications of a planar motor as a transport device are shown.

The stators of such planar motors can have different arrangements of drive coils, and the arrangement of the drive magnets on the transport units can also be very different. For example, U.S. Pat. No. 9,202,719 B2 discloses a planar motor with a multi-layer structure of the stator with a plurality of coil planes lying one above the other. The drive coils in adjacent coil planes are orthogonal to one another in order to form two main movement directions in which the transport units are movable. On average, the coil planes are therefore at different distances from the drive magnets of the transport unit. This results in different efficiencies of the planar motor in the two main movement directions. In order to compensate for this fact, it is proposed for generating the driving force that a higher coil current is applied to the drive coils of a coil plane further away from the drive magnets of the transport unit than is applied to the drive coils of a closer coil plane.

In the publication J. M. M., Rovers, et. al, 2013. Design and measurements of the Double Layer Planar Motor. In: International Electric Machines & Drives Conference. Chicago, 05/12-15/2013. IEEE. a planar motor with a layered arrangement of two coil planes is disclosed. In order to compensate for the different efficiencies that result from the different distances from the magnets of the transport unit, it is proposed that drive coils of different heights are used for the two coil planes.

It is therefore an object of the invention to provide a transport device in the form of a planar motor, and a method for operating a transport device in the form of a planar motor, which allow for a more efficient operation of the transport device.

SUMMARY OF THE INVENTION

According to the invention, the object is achieved in that the at least one transport segment is arranged in a position that is different from a horizontal position, in that a force component of a loading force acting on the transport unit, during operation of the transport device, is greater in the first main direction of movement than a force component of the loading force in the second main direction of movement, wherein the loading force at least includes the transport unit gravitational force of the transport unit.

Advantageous embodiments of the transport device are specified in the dependent claims 2 to 9.

Furthermore, the object is achieved by a method according to claim 10. Advantageous refinements of the method are specified in the dependent claims 11 to 14 and 17 and 18.

BRIEF DESCRIPTION OF THE DRAWINGS

In the following, the present invention is described in greater detail with reference to FIGS. 1a to 6 which, by way of example, show schematic and non-limiting advantageous embodiments of the invention. In the drawings:

FIGS. 1b and 1c each show a transport device in the form of a planar motor, in a side view, FIGS. 2a to 2e show different options for arranging drive coils on a transport segment.

DETAILED DESCRIPTION

Figure 1A:
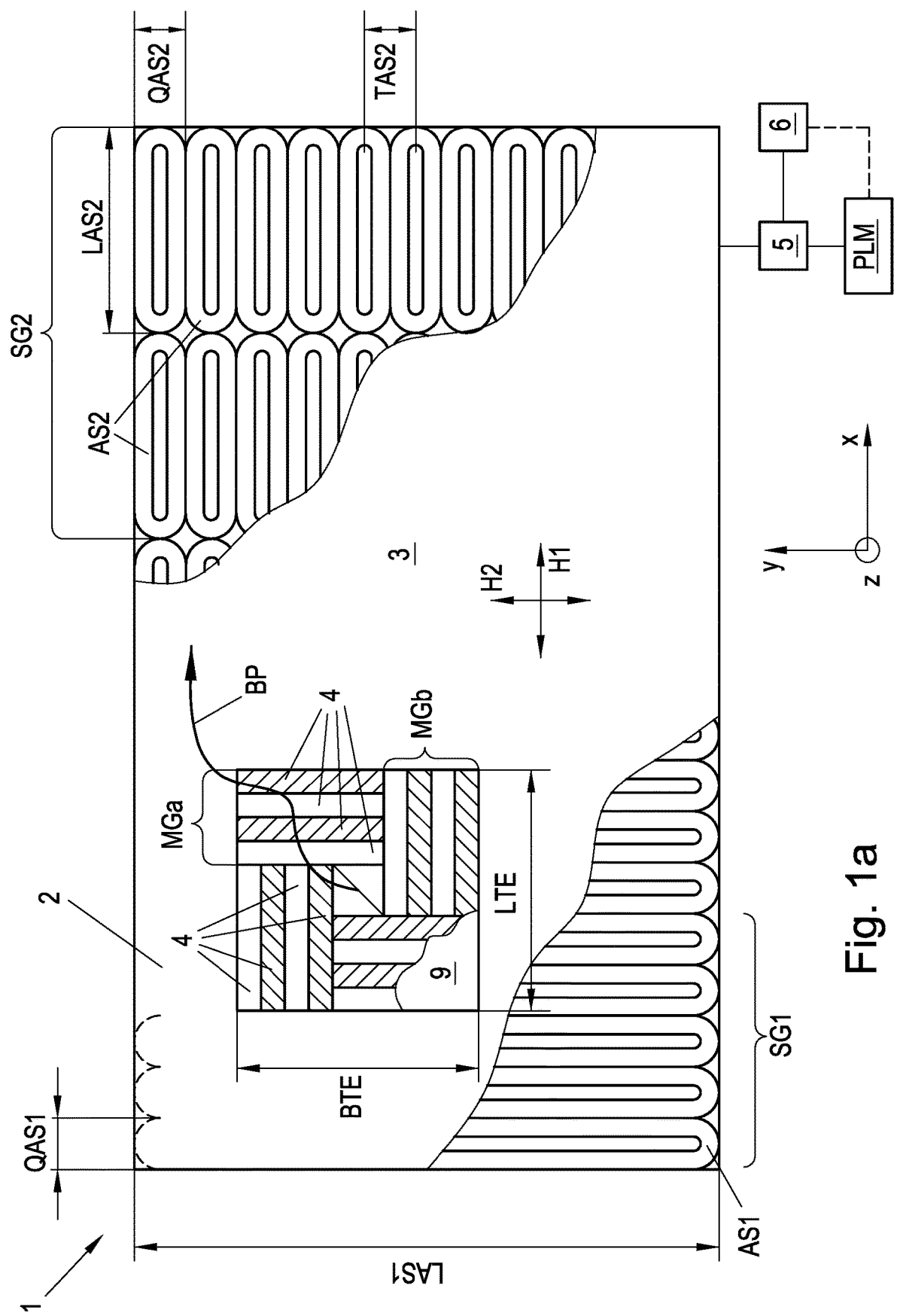
FIG. 1a shows a transport device in the form of a planar motor, in plan view.

FIG. 1a-1c show a simplified exemplary configuration of a transport device 1 in the form of a planar motor. FIG. 1a is a plan view of the transport device 1 and FIG. 1b+1c are side views of the transport device 1. The transport device 1 has at least one transport segment 2 as a stator, which forms a transport plane 3 and at least one transport unit TE, which is movable in the transport plane 3 at least two-dimensionally in two main movement directions H1, H2. Within the scope of the invention, the transport plane 3 refers to the planar surface of the transport segment 2, which is determined by the size and shape of the transport segment 2. The transport plane 3 is arranged horizontally in this case, for example. For the sake of simplicity, only one transport segment 2 is shown in FIG. 1a, but a multiplicity of transport segments 2 (also different ones) could naturally also be lined up in order to form a larger transport plane 3. As a result, the transport device 1 can have a modular design and transport planes 3 of different shapes and surfaces can be realized. Of course, this modular design is only optional and it is also possible to provide only a single transport segment 2 in the form of a single assembly. In the transport plane 3 of the transport segment 2, a plurality of transport units TE, including different transport units, can naturally also be moved simultaneously and independently of one another.

A first coil group SG1 with a plurality of drive coils AS1, which defines the first main movement direction H1, and a second coil group SG2 with a plurality of drive coils AS2, which defines the second main movement direction H2, are arranged on the transport segment 2. The drive coils AS1 of the first coil group SG1 are arranged one behind the other in a specific direction, in this case in the X-direction, in order to form the first main movement direction H1 for the movement of the transport unit TE, which in this case extends along the X-axis. The drive coils AS2 of the second coil group SG2 are arranged one behind the other in a specific direction, in this case the Y-direction, in order to form a second main movement direction H2 for the transport unit TE, which in this case extends along the Y-axis. The drive coils AS1, AS2 of the first and second coil groups SG1, SG2, as shown in FIG. 1a, are preferably arranged relative to one another such that the two main movement directions H1, H2 are perpendicular to one another. Of course, another relative arrangement of the main movement directions H1, H2 would also be conceivable, for example, an angle between the main movement directions H1, H2 that deviates from a right angle.

The drive coils AS1 of the first coil group SG1 and the drive coils AS2 of the second coil group SG2 are in this case each designed as elongated, conventionally wound coils. The drive coils AS1 of the first coil group SG1 each have a longitudinal extension LAS1 in the Y-direction and, relative thereto, a smaller transverse extension QAS1 in the X-direction and are arranged one behind the other in the direction of their transverse extension QAS1, in this case in the X-direction. The transverse extension QASi of a drive coil ASi typically depends on the pole pitch Ti of the drive magnets 4 of the magnet group MGi interacting therewith and/or the winding scheme of the drive coils ASi, i.e., whether it is, for example, a concentrated winding (single-tooth winding) or a distributed winding. The winding schemes are known in the prior art. The direction in which the drive coils AS1 of the first coil group SG1 are arranged one behind the other thus defines the first main movement direction H1 for the movement of the transport unit TE. The drive coils AS1 of the first coil group SG1 are designed as so-called "long coils." This means that its longitudinal extension LAS1 is greater than the extension of the transport unit TE in the respective direction (in this case the Y-direction), in this case, e.g., greater than a transport unit width BTE of the transport unit TE. In the example shown, the longitudinal extension LAS1 is essentially the same size as the extension of the transport segment 2 in the Y-direction. A movement of a transport unit TE in the X-direction, i.e., in the first main movement direction H1, is thus possible at essentially any point in the Y-direction.

The drive coils AS2 of the second coil group SG2 also have a longitudinal extension LAS2, which in this case is shorter than the longitudinal extension LAS1 of the drive coils AS1 of the first coil group SG1. In this case, the longitudinal extension LAS2 of the drive coils AS2 of the second coil group SG2 runs in the X-direction. The drive coils AS2 of the second coil group SG2 also each have a smaller transverse extension QAS2, in this case in the Y-direction, relative to their longitudinal extension LAS2. The transverse extension QAS2 is in this case essentially the same size as the transverse extension QAS1 of the drive coils AS1 of the first coil group SG1, but could also be larger or smaller. The drive coils AS2 of the second coil group SG2 are also arranged one behind the other in the direction of their transverse extension QAS2, in this case in the Y-direction. The direction in which the drive coils AS2 of the second coil group SG2 are arranged one behind the other thus defines the second main movement direction H2 for the movement of the transport unit TE.

The drive coils AS2 of the second coil group SG2 are designed as so-called "short coils." This means that its longitudinal extension LAS2 is smaller than or equal to the extension of the transport unit TE in the respective direction (in this case the X-direction), in this case, for example, the transport unit length LTE of the transport unit TE. In order to still allow for a movement of a transport unit TE in the second main movement H2 in the entire transport plane 3, the drive coils AS2 of the second coil group SG2 are arranged in a plurality of rows next to one another in the X-direction, in this case, e.g., in three rows. However, a reverse arrangement would also be possible, i.e., "long" coils for the second main movement direction H2 and "short" coils for the first main movement direction H1. It would also be possible to use either "long" or "short" coils for both main movement directions H1, H2. For example, it can be advantageous in terms of cost savings if identical drive coils AS1=AS2 are used for both coil groups SG1, SG2.

Of course, the embodiment shown is only to be understood as an example and a person skilled in the art could also provide a different arrangement of the coil groups SG1, SG2 and/or other designs of drive coils. For example, so-called PCB coils could be used in a known manner. PCB stands for "printed circuit board" and means that the coils are integrated directly into a printed circuit board. The two embodiments are known in the prior art and therefore no further detailed description is provided at this point. Another arrangement of the coil groups SG1, SG2 relative to one another and/or to the transport segment 2 would also be conceivable and/or further coil groups SGi with drive coils ASi could also be provided, which form a further main movement direction Hi. However, in the most common case, two differently oriented coil groups SG1, SG2, each with a plurality of drive coils AS1, AS2, are sufficient, wherein each coil group SG1, SG2 defines a main movement direction H1, H2. However, the at least two main movement directions H1, H2 are, as shown, preferably perpendicular to one another, as a result of which the transport segment 2 can be designed in a structurally simpler manner.

For a modular design of a transport plane 3 consisting of a plurality of transport segments 2, it is also advantageous if the transport segments 2 each have a square or rectangular transport plane 3. The transport segments 2 can then be lined up in a simple manner, so that the respective first main movement direction H1 of a transport segment 2 runs parallel or normal to the first main movement direction H1 of the respective adjacent transport segment 2. A transport plane 3 can thus be built up easily and flexibly from a plurality of transport segments 2. It is also not absolutely necessary for adjacent transport segments 2 to be aligned with one another; instead, an offset would also be possible.

With the transport device 1 shown, an essentially unrestricted movement of a transport unit TE in the two main movement directions H1, H2 would be possible, for example, in the transport plane 3 of the transport segment 2. It could be possible that the transport unit TE can only be moved, for example, along the X-axis or only along the Y-axis. The transport unit TE can naturally be moved simultaneously in both main movement directions H1, H2, e.g., with a two-dimensional movement path BP lying in the transport plane 3 with an X-coordinate and a Y-coordinate, as indicated on the transport unit TE in FIG. 1a. With a corresponding structural design of the transport segment 2 and the respective transport unit TE, the other four degrees of freedom can also be used in a known manner at least to a limited extent (translational movement in the vertical direction Z and rotation about the three axes X, Y, Z).

A control unit 5 is also provided in the transport device 1, with which the drive coils AS1, AS2 of the transport segment 2 can be controlled, as indicated in FIG. 1a. The control unit 5 can, e.g., also be connected to, or integrated in, a higher-level system control unit 6. If a plurality of transport segments 2 is provided in the transport device 1, a segment control unit (not shown) can also be provided for each transport segment 2 or a group of transport segments 2, and/or a coil control unit can be provided for each drive coil ASi, which can also be integrated in the control unit 5. The movement path BP of a transport unit TE can be predefined via the control unit 5 and/or the system control unit 6, for example, on the basis of a specific production process of a system in which the transport device 1 can be integrated.

As mentioned above, a plurality of transport units TE can naturally also be moved simultaneously and independently of one another on the transport device 1. The control unit 5 and/or the system control unit 6 then ensures that the movement sequences of the transport units TE are synchronized with one another or coordinated with one another, for example, in order to prevent transport units TE from colliding with one another and/or with transported objects. A control program that realizes the desired movement paths of the individual transport units TE runs on the control unit 5. The control unit 5 or the system control unit 6 can, for example, also be connected to a planning module PLM for planning the movement path BP. The planning module PLM can be, e.g., a computer on which the actually built up transport device 1, in particular the transport plane 3, is implemented virtually, for example.

A plurality of drive magnets 4 are arranged on the at least one transport unit TE, which interact electromagnetically with the drive coils AS1, AS2 of the at least two coil groups SG1, SG2 for moving the transport unit TE. For this purpose, the transport unit TE generally has a main body 9, on the underside of which (facing the transport plane 3) the drive magnets 4 are arranged, as can be seen in FIG. 1b. FIG. 1a shows the main body 9 largely broken away in order to be able to see the arrangement of the drive magnets 4.

In the example shown, two first magnet groups MGa and two second magnet groups MGb are arranged on the transport unit TE. A single first magnet group MGa and a single second magnet group MGb per transport unit TE are essentially sufficient to operate the transport device 1. Of course, more than two first magnet groups MGa and more than two second magnet groups MGb can also be arranged per transport unit TE. An unequal number of first and second magnet groups MGa, MGb would also be conceivable, for example, two first magnet groups MGa and one second magnet group MGb. In the magnet groups MGa, MGb, a plurality of drive magnets 4 of different magnetization directions is provided, which are arranged one behind the other in a specific arrangement direction with a specific pole pitch Ta, Tb. In this case, the arrangement direction of the first magnet groups MGa corresponds to the X-direction, and the arrangement direction of the second magnet groups MGb corresponds to the Y-direction. Analogously to the main movement directions H1, H2, the arrangement directions are thus perpendicular to one another. The arrangement directions of the magnet groups MGa, MGb preferably run as parallel as possible to the main movement directions H1, H2 in order to allow for the most efficient generation of electromagnetic force possible. The example shown is a known 1D arrangement of the drive magnets 4 on the transport unit TE, but an also known 2D arrangement would also be possible, as will be explained in detail with reference to FIG. 4*a*-4*d*.

In order to move the transport units TE in the transport plane 3, the first and second drive coils AS1, AS2 can be individually controlled (energized) by the control unit 5. Possibly required power electronics can be arranged in the control unit 5 or on the transport segment 2. An essentially moving magnetic field is generated in the first main movement direction H1 by an appropriately temporally offset activation of the first drive coils AS1. The moving magnetic field in the first main movement direction H1 mainly interacts electromagnetically with the drive magnets 4 of the first magnet group(s) MGa in order to generate the driving force for setting a predefined movement state of the respective transport unit TE in the first main movement direction H1, e.g., an acceleration, a constant speed, or a deceleration to standstill. Analogously, by controlling the second drive coils AS2 in a temporally offset manner, an essentially moving magnetic field is generated in the second main movement direction H2, which mainly interacts electromagnetically with the drive magnets 4 of the second magnet group(s) MGb in order to generate the driving force for moving the transport unit TE in the second main movement direction H2. Depending on the activation of the drive coils AS1, AS2, the moving magnetic fields are superimposed, as a result of which the transport unit TE can be moved in the desired manner along a predefined two-dimensional movement path BP in the transport plane 3.

In addition to the two essentially unlimited translational degrees of freedom in the main movement directions H1, H2 in the transport plane 3, a limited translational movement of a transport unit TE in the normal direction on the transport plane 3 is also possible, in this case in the direction of the Z-axis. In the illustrated arrangement of the transport segment 2, the Z-axis is perpendicular to the horizontal transport plane 3. Depending on the arrangement and the design of the drive coils AS1, AS2 of the coil groups SG1, SG2 and the first and second magnet groups MGa, MGb interacting therewith, a limited rotation of the transport units TE about the three spatial axes X, Y, Z is also possible.

As mentioned above, adjacent drive magnets 4 of the magnet groups MGa, MGb have different magnetic orientations and are spaced apart from one another in a specific pole pitch Ta, Tb (in this case from the center of one drive magnet 4 to the center of the adjacent drive magnet 4). In general, the magnetic field generated by the magnet group MGi changes its orientation by 180° within the pole pitch Ti. The necessary distance between the drive magnets 4 for generating a magnetic field with the desired pole pitch Ti also depends on the arrangement of the drive magnets 4 within a magnet group MGi, in particular on a gap width of any gap provided between adjacent drive magnets 4, on the magnetization direction of adjacent drive magnets 4 (e.g., 180° opposite or Halbach arrangement), and the magnet width MBi of the drive magnets 4. In the Halbach arrangement, it can be advantageous if, for example, the outermost drive magnets 4 of a magnet group MGi have, for example, half the magnet width MBi of the drive magnets 4 located in between.

This can mean, e.g., that a magnetic north pole and south pole alternate in each case, as indicated in FIG. 1*a* by the shaded and not shaded drive magnets 4 on the transport unit TE, which corresponds to an arrangement of adjacent drive magnets 4 rotated by 180°. The known Halbach arrangement, in which the magnetization direction of adjacent drive magnets 4 is rotated by 90° to one another, has also proven to be advantageous. In this case, the pole pitch Ta, Tb refers in each case to the distance between two drive magnets 4 adjacent in the arrangement direction and with opposite magnetic orientations (north/south pole). If the drive magnets 4 have the same magnet width MB (in the arrangement direction), if adjacent drive magnets have an orientation direction rotated by 180° and if the drive magnets 4 are directly adjacent to one another (which is usually the case), the pole pitch Ta, Tb corresponds to the respective magnet width MBa, MBb. The pole pitch Ta, Tb and the magnet width MBa, MBb are shown by way of example on the transport unit TE in FIG. 4*a* and FIG. 4*c*.

In operation, an air gap L is provided between the transport plane 3 of the transport segment 2 and the drive magnets 4 of the magnet groups MGa, MGb of a transport unit TE, as can be seen in FIG. 1*b*. Preferably, a preferably magnetically conductive cover layer is also provided on the transport segment 2 in order to shield the underlying drive coils AS1, AS2 from external influences and to form an essentially smooth transport plane 3. In FIG. 1*a*, the cover layer is shown partially broken away in order to be able to recognize the arrangement of the drive coils AS1, AS2 located underneath. Analogously, a cover layer to cover the drive magnets 4 can naturally also be provided on the transport units TE. The air gap L then extends between the cover layer and the drive magnets 4 of the respective transport unit TE. In order to create and in particular maintain the air gap L, the drive coils AS1, AS2 and the drive magnets 4 act in a known manner during operation not only to generate a driving force (which is required for movement in the main movement directions H1, H2), but also to generate a levitation force FS, in this case in the Z-direction. The levitation force FS also acts when the transport unit TE is at a standstill in order to generate and maintain the air gap L. In addition to the depicted essentially horizontal installation position of the transport segment 2 shown in FIGS. 1*a* and 1*b*, an inclined installation position in the manner of an inclined plane would also be conceivable, as shown in FIG. 5*b*. A substantially vertical installation position according to FIG. 5*c* would also be possible. Of course, any other installation positions of the transport segment 2 are possible.

Levitation force FS refers to the part of the electromagnetically generated force that acts on the transport unit TE, and is opposed to the weight force FG and a force component of any process force FP in the gravitational direction (e.g., weight force of a transported object O and possibly also a process force acting on the transport unit TE due to a work process in a process station of the transport device 1), as will be described in more detail below with reference to FIGS. 5*a* to 5*e*. The amount of the levitation force FS corresponds essentially to the vectorial sum of the weight force FG and the process force FP (in the gravitational direction), so that a static equilibrium state of the transport unit TE is achieved while maintaining the air gap. Driving force refers to the part of the electromagnetically generated force that leads to a change in the movement state of the transport unit TE (e.g., constant speed, acceleration, deceleration, etc.) or the part that must be applied in addition to the levitation force FS in order to keep the transport unit TE at a standstill in the case of a process force FP not acting in the gravitational direction. In addition to the two-dimensional movement in the transport plane 3, a specific movement of the transport unit TE in the vertical direction is also possible, i.e., normal to the transport plane 3. The air gap L can be increased and decreased to a limited extent by appropriate control of the drive coils AS1, AS2, as a result of which the transport unit TE can be moved in the vertical direction, in this case in the Z-direction, as indicated by the double arrow on the transport unit TE in FIG. 1b. The extension of the available freedom of movement in the vertical direction depends essentially on the structural design of the transport device 1, in particular on the maximum magnetic field that can be generated by the drive coils AS1, AS2 and the drive magnets 4, as well as the mass and load of the transport unit TE. Depending on the size and design of the transport device 1, the available range of movement in the vertical direction can be, for example, in the range from a few mm to several centimeters.

Figure 3C:
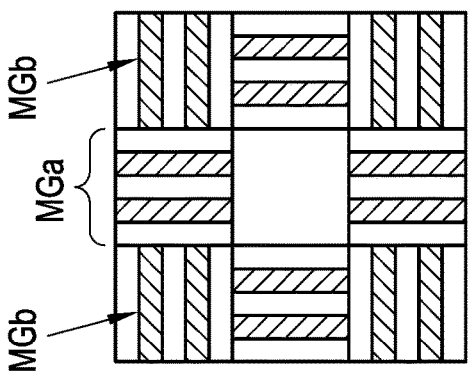
FIGS. 3a to 3f show different possibilities of a 1D arrangement of drive magnets on a transport unit.
Figure 3B:
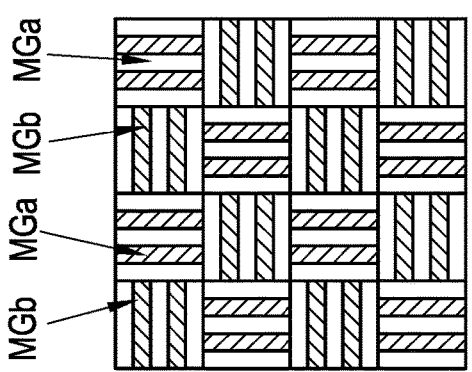
Figure 3A:
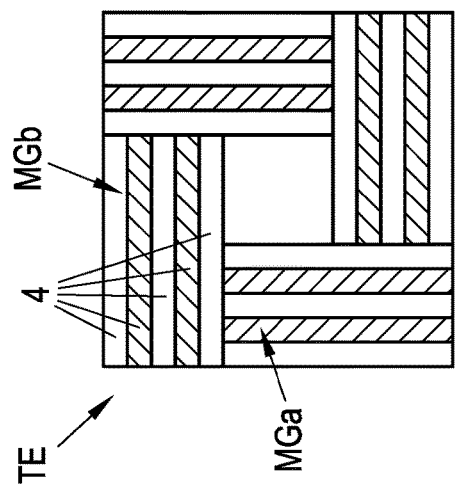
Figure 3F:
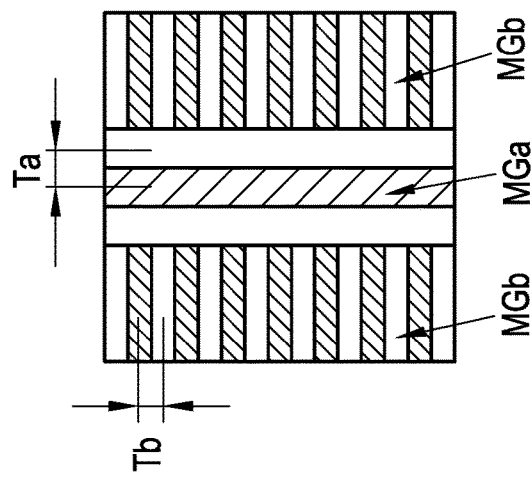
Figure 3E:
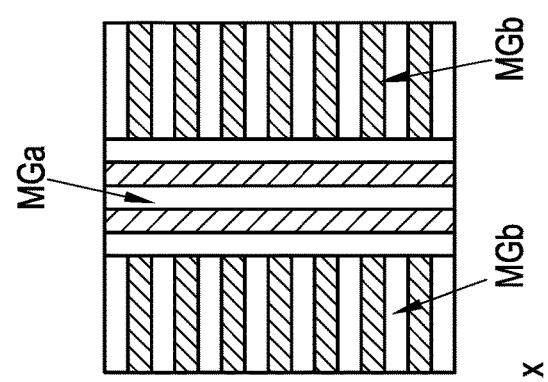
Figure 3D:
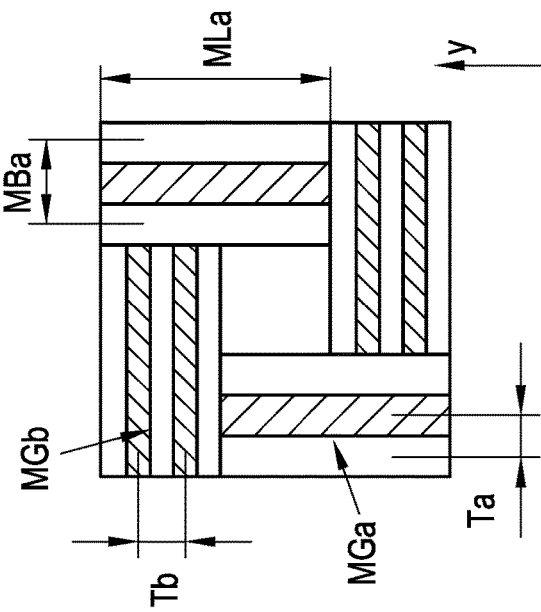
Figure 4A:
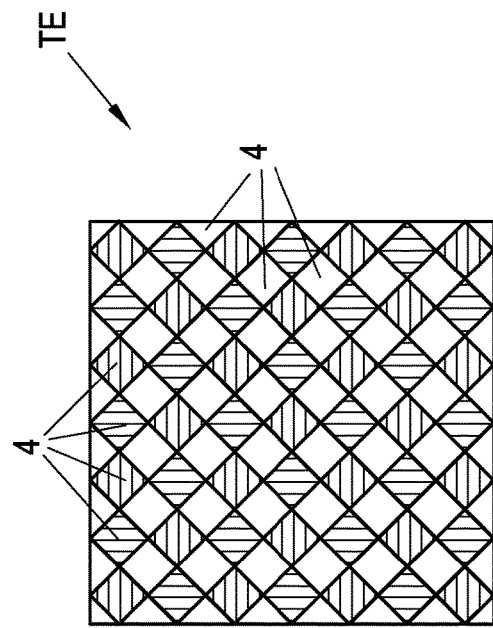
FIGS. 4a to 4d show different possibilities of a 2D arrangement of drive magnets on a transport unit, FIGS. 5a to 5e each show force ratios on a transport unit on differently oriented transport segments.
Figure 4B:
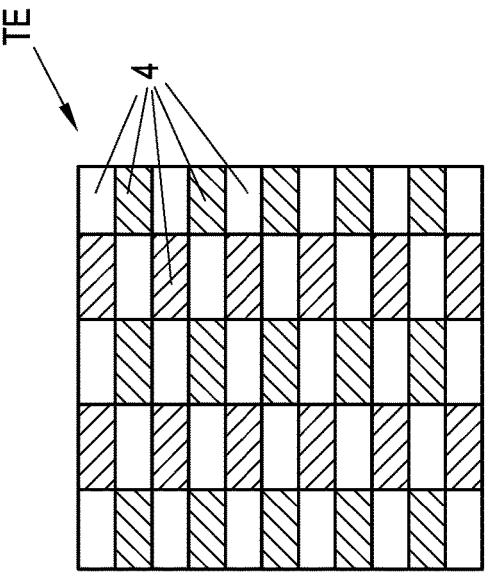
Figure 4C:
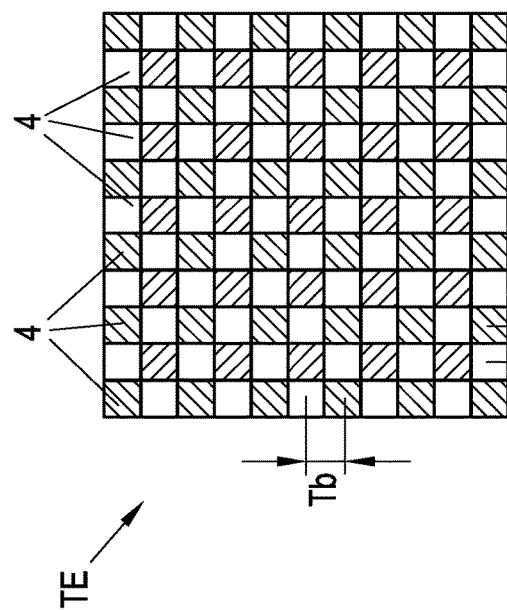
Figure 4D:
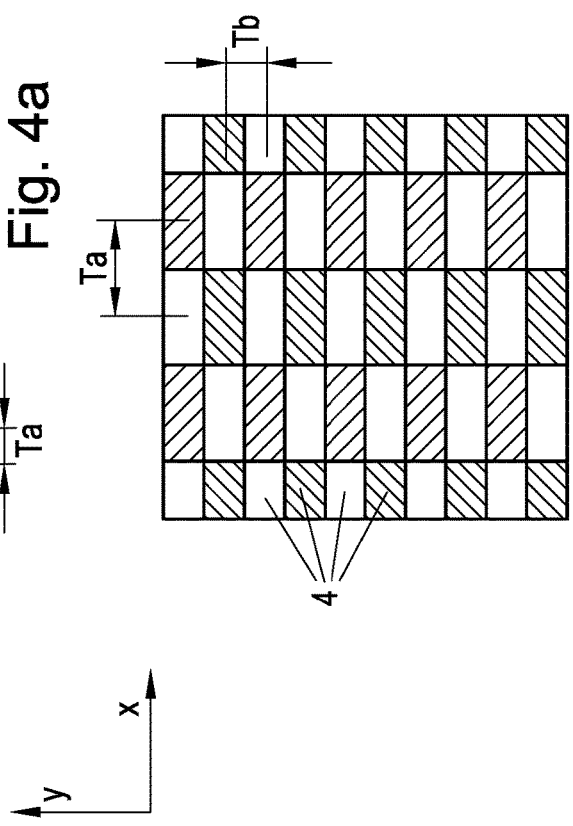

It is also provided that the drive coils AS1, AS2 of the first and second coil groups SG1, SG2 have different coil properties influencing the magnetic field and/or that the drive magnets 4 of the transport unit TE (in this case the first magnet group MGa) predominantly interacting with the drive coils AS1 of the first coil group SG1 have different magnetic properties influencing the magnetic field than the drive magnets 4 (in this case the second magnet group MGb) predominantly interacting with the drive coils AS2 of the second coil group SG2. As a result, the transport unit TE can be moved in the two main movement directions H1, H2 with a different efficiency pH1 #pH2 and/or a different maximum force and/or a different accuracy. Coil properties influencing the magnetic field refer to changeable structural or energetic parameters of the drive coils ASi, by means of which the magnetic field generated by the drive coils ASi, in particular the magnetic flux, can be influenced. These include, e.g., an average coil spacing Si of the drive coils ASi in the normal direction from the drive magnets 4 of the transport unit TE interacting therewith (FIG. 1b), a coil pitch TASi of adjacent drive coils ASi in a coil group SGi, a conductor resistance of the drive coils ASi, a maximum coil current that can be applied to drive coils ASi, a number of windings of the drive coils ASi, and a coil geometry of the drive coils ASi. Coil geometry refers in particular to the longitudinal extension LASi and the transverse extension QASi of the drive coils ASi parallel to the transport plane 3, as well as a coil height $h_{ASi}$ of the drive coils ASi normal to the transport plane 3, as indicated on the drive coils AS2 in FIG. 1b. Furthermore, the winding scheme also influences the coil geometry of the drive coils ASi, i.e., whether it is a concentrated winding or a distributed winding. The magnetic properties of the drive magnets 4 of the transport unit TE influencing the magnetic field refer to, for example, a remanent flux density of the drive magnets 4, a relative orientation between the drive magnets 4 and the drive coils ASi interacting therewith, a pole pitch Ti of the drive magnets 4, and a magnetic geometry of the drive magnets. The magnet geometry relates in particular to a magnet length LMi, the magnet width MBi, and the magnet height HMi, as shown by way of example in FIG. 1b and FIG. 3d.

In the following, some exemplary measures are listed as to how the efficiency μHi of the electromagnetic force formation in a main movement direction Hi of the transport device 1 can be increased by means of the magnetic properties influencing the magnetic field and/or the coil properties influencing the magnetic field. Of course, several magnetic properties and/or coil properties can also be changed.

The relative orientation between the drive magnets 4 and the drive coils ASi should be such that the conductor orientation of the drive coils ASi is orthogonal to the magnetic field generated by the drive magnets 4. In practice, this is achieved, for example, by using elongated drive coils ASi and elongated drive magnets 4, arranged as parallel as possible to the longitudinal extension LASi, of the magnet group MGi interacting therewith (see, e.g., FIG. 1a). In addition, the relative orientation between the drive coils ASi of a coil group SGi (e.g., SG1) and the magnet group MGi (e.g., MGb), which predominantly interacts with the drive coils ASi of the respective other coil group SGi (e.g., SG2), should be as orthogonal as possible, so that few or no coupling effects can develop. In the example according to FIG. 1a, this is achieved, for example, in that the drive magnets 4 of the second magnet groups MGb are arranged as parallel as possible to the transverse extension QAS1 of the drive coils ASi of the first coil group SG1. The distance between a conductor of a drive coil ASi and the drive magnet 4 interacting therewith (corresponds to the average coil spacing Si in the examples shown) should be as small as possible, since the flux density decreases exponentially with the normal distance.

The conductor resistance of the drive coil ASi should be as low as possible. Options for reducing the conductor resistance are, e.g., providing a so-called "covered length" of a drive coil ASi that is as high as possible and/or increasing the cross section of the conductors of a drive coil ASi. The "covered length" is the part of the conductor which is located in the range of influence of the magnetic field of the drive magnets 4. The "covered length" should preferably correspond to the entire extension of the conductor or the drive coil ASi. If a plurality of conductors is used to generate the driving force/levitation force, which is usually realized by using drive coils ASi, a high copper fill factor is advantageous (the definition of the copper fill factor is generally known and essentially corresponds to the ratio between the sum of the cross-sectional surface of the individual conductors of a coil to the total cross-sectional surface of the coil). Since the specific resistance of a conductor increases with temperature, the efficiency of a conductor can be increased by reducing the temperature, e.g., by dissipating heat.

The maximum force that can be generated on the transport unit TE (both in the movement direction and in the vertical direction) can be influenced, for example, by the maximum coil current that can be applied to the drive coils ASi (which is essentially limited by the power electronics) and/or by the coil geometry and the number of windings. The accuracy of the positioning of the transport unit TE can be influenced, for example, by the size of the coil pitch TASi. The coil pitch TASi designates the distance between adjacent drive coils ASi, usually between the coil axes, as indicated by way of example in FIG. 1a on the drive coils AS2 of the second coil group SG2. From this, it can be seen that there is a wealth of parameters with which the efficiency μHi of the movement of the transport unit TE, the maximum force that can be generated on the transport unit TE and/or the positional accuracy of the movement of the transport unit TE can be influenced. Of course, it would be possible to try to optimize all or the highest possible number of the coil properties of the drive coils ASi influencing the magnetic field and the magnetic properties of the drive magnets 4 influencing the magnetic field. However, this is often not possible or desirable, e.g., for reasons of cost efficiency. For cost reasons, for example, it can be advantageous to use coils of identical design for the drive coils AS1 of the first coil group SG1 and the drive coils AS1 of the second coil group SG2, which means that, for example, in the case of different average coil spacings S1≠S2 of the drive coils AS1, AS2, the result would be an essentially automatic difference in efficiency. In the following, using FIG. 1a-1c, different average coil spacings S1≠S2 of the drive coils AS1, AS2 will be addressed, wherein the remaining coil properties influencing the magnetic field and the magnetic properties influencing the magnetic field are uniform in both main movement directions H1, H2.

The drive coils AS1 of the first coil group SG1 are spaced apart from the first magnet group MGa in the normal direction (in this case in the Z-direction) on the transport plane 3 at an average first coil spacing S1, and the drive coils AS2 of the second coil group SG2 are spaced apart from the second magnet group MGb, relative to the average first coil spacing S1, at a greater average second coils spacing S2 in the normal direction on the transport plane 3, as can be seen in FIG. 1b. The drive coils AS1 of the first coil group SG1 are therefore closer to the drive magnets 4 of the first magnet group MGa in the Z-direction than the drive coils AS2 of the second coil group SG2 are to the drive magnets 4 of the second magnet group MGb. In the example shown in FIG. 1b, the two coil groups SG1, SG2 are arranged one above the other.

The average coil spacings S1, S2 are measured from the coil center of the respective drive coils AS1, AS2 as seen looking in the Z-direction. The drive coils AS1, AS2 are preferably designed to be ironless in order to avoid disruptive magnetic attraction forces between the respective transport unit TE and the transport segment 2; they are also called "air coils." In the example shown in FIG. 1a+1b, the drive coils AS1, AS2 are designed as conventionally wound, elongated coils with an essentially oval shape, each having a coil axis in the normal direction on the transport plane 3. However, the drive coils AS1, AS2 could also be designed as so-called PCB coils. The drive coils AS1, AS2 of the respective coil group SG1, SG2 can, for example, also be arranged in layers in several first coil planes SE1 with first drive coils AS1 and several second coil planes SE2 with second drive coils AS2 in the normal direction on the transport plane 3 one above the other on the transport segment 2, as shown in FIG. 1c.

In the example on the left of FIG. 1c, a coil block with four first coil planes SE1 and a coil block with four second coil planes SE2 are arranged one above the other on the transport segment 2. In the depiction on the right in FIG. 1c, four first and four second coil planes SE1, SE2 are arranged alternately on the transport segment 2 in the Z-direction. The average coil spacings S1, S2 are in this case the average distances of the coil planes SE1, SE2 from the transport plane 3 in the Z-direction, wherein the following applies $$S1 = \frac{\sum_{i=1}^{j} S1.i}{j}; S2 = \frac{\sum_{i=1}^{k} S2.i}{k}$$

with the coil spacing S1.i, S2.i of the first and second coil planes SE1, SE2 and number j, k of the first and second coil planes SE1, SE2.

At the same structural boundary conditions (identical geometry (length, width, height), same number of windings) and the same energetic boundary conditions (same maximum current or voltage, etc.), the drive coils AS1 of the first coil group SG1 generate the same (maximum) magnetic field as the drive coils AS2 of the second coil group SG2. The magnet groups MGa, MGb on the transport unit TE are designed to be essentially identical (same geometry (magnet length, magnet width, magnet height), same number of drive magnets 4, same pole pitch Ti, same magnetization directions, same magnetic field strength, etc.), so that the magnet groups MGa, MGb generate magnetic fields of essentially the same size, which interact with the magnetic fields generated by the drive coils AS1, AS2. However, since the drive coils AS1 of the first coil group SG1 are on average closer to the drive magnets 4 of the first magnet group MGa than the drive coils AS2 of the second coil group SG2 are to the drive magnets 4 of the second magnet group MGb, the result is a higher efficiency of the electromagnetic force generation in the first main movement direction H1 than in the second main movement direction H2. This affects both the generation of the driving force and the generation of the levitation force. This results in a known manner in a greater efficiency in the first main movement direction H1 than in the second main movement direction H2.

FIG. 2a-2e schematically show different options for arranging the drive coils AS1, AS2 of the first and second coil groups SG1, SG2 on a transport segment 2. FIG. 2a FIG. +2b show so-called "single-layer" variants in which the first and second coil groups SG1, SG2 are arranged in the same plane. FIG. 2c-2e show so-called "multi-layer" designs in which the first and second coil groups SG1, SG2 are arranged in layers one above the other in the vertical direction, as explained above with reference to FIG. 1b+1c. For example, in a "double-layer" design, two layers of drive coils AS1, AS2 arranged one above the other are provided. The first main movement direction H1 (with higher efficiency µH1>µH2) thus results essentially automatically (with otherwise the same coil properties influencing the magnetic field and magnetic properties influencing the magnetic field) because the drive coils AS1 of the first coil group SG1 are closer to the transport plane 3 in the normal direction on the transport plane 3 than the drive coils AS2 of the second coil group SG2.

The "single-layer" design is usually used for transport devices 1 with two equivalent main movement directions H1, H2. In this case, the drive coils AS1, AS2 of the first and second coil group SG1, SG2 each have the same coil spacing S1=S2 from the transport plane 3. With otherwise the same coil properties influencing the magnetic field and magnetic properties influencing the magnetic field, essentially the same efficiencies µH1=µH2 would result for the two main movement directions H1, H2. As described above, in addition to the coil spacing Si, there are many other coil properties influencing the magnetic field and magnetic properties influencing the magnetic field, the change of which can change the efficiencies µH1, µH2. It would therefore basically also be conceivable with a "single-layer" design to generate different efficiencies µH1≠µH2 of the two main movement directions H1, H2, for example, through a different pole pitch Ta≠Tb of the drive magnets 4 of the two magnet groups MGa, MGb and/or a different magnet geometry of the drive magnets 4 of the two magnet groups MGa, MGb.

FIG. 2a. shows a so-called "herringbone" arrangement of the drive coils AS1, AS2 of the two coil groups SG1, SG2. In contrast to the other designs of FIG. 2b-2e, the two main movement directions H1, H2 do in this case not run parallel to the edges of the transport segment 2 (in this case in the X- and Y-direction), but obliquely to them. Details hereto are disclosed, for example, in Jansen, J. W., 2007. Magnetically levitated planar actuator with moving magnets. In: electromechanical analysis and design Eindhoven: Technical University of Eindhoven DOI: 10.6100/IR630846. FIG. 2c shows a "double-layer" embodiment in which "long" drive coils AS1, AS2 are provided both in the first coil group SG1 and in the second coil group SG2. FIG. 2d shows an embodiment with "long" drive coils AS1 in the first coil group SG1 and "short" drive coils AS2 in the second coil group SG2, analogously to FIG. 1a. FIG. 2e shows an example with "short" drive coils AS1 in the first coil group SG1 and "short" drive coils AS2 in the second coil group SG2.

FIG. 3a-f and FIG. 4a-d schematically show different arrangements of drive magnets 4 on a transport unit TE. A basic distinction is made between a so-called 1D arrangement (FIG. 3a-3f) and a 2D arrangement (FIG. 4a-4d). In the 1D arrangement, as already described in detail, at least one first magnet group MGa with a plurality of drive magnets 4 for the first main movement direction H1 (in this case X-axis) and at least one second magnet group MGb with a plurality of drive magnets 4 for the second main movement direction H2 (in this case Y-axis) are provided. The magnet groups MGa, MGb each have a specific number of drive magnets 4, in particular permanent magnets, arranged one behind the other in a specific arrangement direction (in this case MGa in the X-direction and MGb in the Y-direction). Adjacent drive magnets 4 have a different magnetization direction. For example, the magnetization direction of adjacent drive magnets 4 can be rotated by 180° to one another, i.e., alternating magnetic north and south poles, as indicated by the shaded and not shaded drive magnets 4. As mentioned above, the drive magnets 4 of a magnet group MGi can also be arranged in the known Halbach arrangement, wherein a drive magnet 4 with a magnetization direction rotated by 90° is provided, for example, between drive magnets 4 with opposite magnetization directions (north pole, south pole). The Halbach arrangement has the advantage that the magnetic flux on one side of the magnet group MGi (preferably on the side facing the transport plane 3) is greater than on the opposite side. A particularly advantageous, sinusoidal magnetic field image of the magnetic field of a magnet group MGi can be achieved if the respective outermost drive magnets 4 of the magnet group MGi have a reduced, in particular half the magnet width MBi than the interjacent drive magnets 4 of the magnet group MGi, as is shown, for example, in FIG. 8. The Halbach arrangement is known in the prior art and therefore no further details are provided at this point.

In the 2D arrangement, individual drive magnets 4 with different magnetization directions are arranged on the transport unit TE essentially in the manner of a chessboard. The drive magnets 4 with different magnetization directions are arranged alternately and offset in two arrangement directions (in this case X- and Y-direction). The two directions are preferably oriented to one another in the same way as the two main movement directions H1, H2, i.e., they are, for example, perpendicular to one another. It is immediately apparent that there is a large number of different options for the arrangement, wherein the most common variants of the 1D arrangement are shown in FIG. 3a-3f and the most common variants of the 2D arrangement are shown in FIG. 4a-4d. In the 2D arrangement, the first magnet group MGa corresponds to the drive magnets 4 arranged alternately in one direction (e.g., in the X-direction) and the second magnet group MGb corresponds to the drive magnets 4 arranged alternately in the respective other direction (e.g., in the Y-direction). The magnet groups MGa, MGb are therefore not separate in the 2D arrangement, as in the 1D arrangement, but the drive magnets 4 are both part of the first magnet groups MGa and part of the second magnet groups MGb.

For example, in order to achieve different efficiencies μH1, μH2 and/or different maximum forces and/or different positioning accuracy of the transport unit TE in a "single-layer" arrangement of the coil groups SG1, SG2 (FIG. 2a+2b) on a transport segment 2 (with otherwise identical coil properties of the drive coils AS1, AS2 influencing the magnetic field), the magnetic properties of the drive magnets 4 of the transport unit TE influencing the magnetic field can also be changed, as already mentioned. For example, one option provides that the pole pitch Ta of the first magnet group(s) MGa differs from the pole pitch Tb of the second magnet group(s) MGb, as exemplified in FIG. 3d+3f for the 1D arrangement and in FIG. 4c+4d for the 2D arrangement. If, in the "double-layer" embodiment of the transport segment 2 shown in FIG. 1a-1c, in which the drive coils AS1 of the first coil groups SG1 have a smaller coil spacing S1 than the drive coils AS2 of the second coil group SG2, different pole pitches Ta #Tb are also provided on the magnet groups MGa, MGb of the transport unit TE, the pole pitch Ta of the first magnet group MGa (which interacts with the first coil group SG1) is preferably smaller than the pole pitch Tb of the second magnet group MGb. This is advantageous because the magnetic field generated by the drive magnets 4 penetrates further into the transport segment 2 with increasing pole pitch Ti in the Z-direction. Therefore, the magnet group MGi with the greater pole pitch Ti interacts more efficiently with the drive coils ASi of the more distant coil group SGi.

As initially mentioned, attempts have been made in the prior art to compensate for the difference in efficiency between the two main movement directions H1, H2 in order to achieve main movement directions that are as equivalent as possible in terms of the available electromagnetic force. However, in the case of the present invention, the difference in efficiency between the two main movement directions H1, H2 is used in a targeted manner, as will be explained in more detail below.

In order to maintain the air gap L, i.e., the state of levitation of the transport unit TE, it is necessary that the levitation force FS (which is generated by the electromagnetic interaction of the drive coils AS1 with the drive magnets 4 of the first magnet group(s) MGa and the drive coils AS2 with the drive magnets 4 of the second magnet group(s) MGb) opposing gravitation compensates for the weight force FG of the transport unit TE plus any constant process forces FP (in the gravitational direction). Depending on the installation situation of the transport segment 2 of the transport device 1, the levitation force FS does however not necessarily act in the normal direction on the transport plane 3 of the transport segment 2, as is shown in FIGS. 5a to 5e.

Figure 5E:
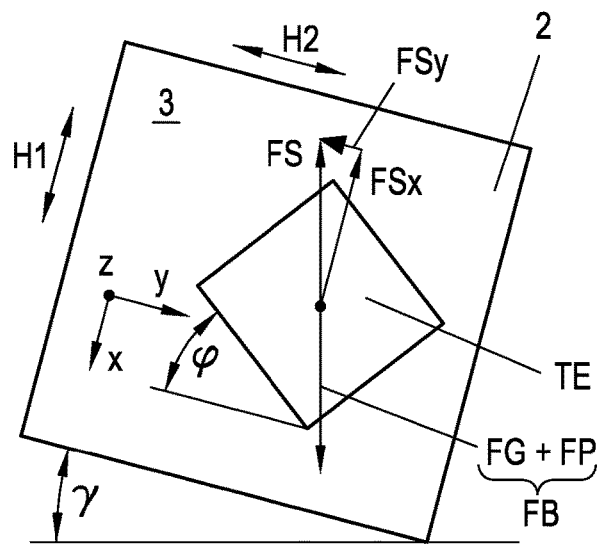

In a horizontal installation situation (FIG. 5a), the levitation force FS acts normal to the transport plane 3 of the transport segment 2 (in this case, vertically in the direction of the Z-axis); in a vertical installation situation (FIGS. 5c to 5e), the levitation force FS acts substantially parallel to the transport plane 3 of the transport segment 2. When the transport segment 2 of FIG. 5a is inclined at an angle of inclination α=90° from the horizontal plane with respect only to the Y-axis, the levitation force FS acts, for example, only in the direction of the X-axis, as can be seen in FIG. 5c, and therefore at the same time in the first main direction of movement H1. In an installation situation (FIG. 5b) between horizontal and vertical, corresponding components of the levitation force FS, FSx in the X-direction and FSz in the Z-direction are produced according to the angle of inclination α of the transport segment 2. The same of course also applies to the Y-Z plane for an inclination (not shown) of the transport segment 2 of FIG. 5a at an angle of inclination β from the horizontal plane only with respect to the X-axis.

For example, with an angle of inclination β=90°, the levitation force FS would act in an analogous manner only in the direction of the Y-axis, and thus in the second main direction of movement H2.

In FIG. 5d, the transport segment 2 is shown in a plan view of the transport plane 3. The transport plane 3 of the transport segment 2 is inclined in this case at an angle of inclination α=90° from the horizontal with respect to the Y-axis (similarly to FIG. 5c). In addition, the transport segment 2 is rotated at an angle of rotation γ with respect to the vertical axis normal to the transport plane 3, in this case the Z-axis, wherein the angle of rotation γ is measured between the lower side of the rectangular, in particular square, transport plane 3 and the horizontal plane. The levitation force FS is divided into a force component FSx in the X-direction (which also corresponds to the first main direction of movement H1 in this case) and a force component FSy in the Y-direction (which also corresponds to the second main direction of movement H2 in this case). The same of course also applies to the case of an inclination (not shown) of the transport segment 2 at an angle of inclination β with respect to the X-axis and an additional rotation at an angle of rotation γ about the Z-axis.

In the example according to FIG. 5e, the transport segment 2 is aligned in the same way as in FIG. 5d. In addition, however, the transport unit TE is rotated at a relative angle φ with respect to the transport segment 2 about the vertical axis (Z-axis), which is normal to the transport plane 3. This changes the properties that influence the magnetic field of the drive magnets 4 interacting with the drive coils AS1, AS2 of the two coil groups SG1, SG2. The assignment of the two main directions of movement H1, H2 (first main direction of movement H1 with higher efficiency μH1>μH2 in the X-direction; second main direction of movement H2 with lower efficiency μH2<μH1 in the Y-direction) remain unchanged in the example shown, but both efficiencies μH1, μH2 decrease in comparison to the arrangement according to FIG. 5d, due to the non-optimal alignment between the drive magnets 4 and the drive coils AS1, AS2. Depending on the coil properties of the drive coils AS1, AS2 that affect the magnetic field and the magnetic properties of the drive magnets 4 that affect the magnetic field, a rotation of the transport unit TE by a relative angle φ could also result in the main directions of movement H1, H2 being reversed, for example H2 in the X-direction and H1 in the Y-direction, where μH1>μH2.

In general, if the transport segment 2 is in a position that deviates from the horizontal at an angle of inclination α with respect to the Y-axis and/or an angle of inclination β with respect the X-axis and/or an angle of rotation γ about the Z-axis, this produces corresponding components of the levitation force FS, FSH1 in the first main direction of movement H1 (in this case, FSx in the X-direction), FSH2 in the second main direction of movement H2 (in this case, FSy in the Y-direction), and FSz in the Z-direction in accordance with the angles α, β, γ. The levitation force FS thus compensates for the weight force FG caused by the mass of the transport unit TE and a force component of any process force FP in the gravitational direction, which is generated, for example, by a transported object O, as indicated in FIG. 5a, and/or which is generated by a work process acting on the transport unit TE, which work process is carried out in a process station (not shown) of the transport device 1. Due to the levitation force FS, the position of the transport unit TE relative to the transport segment 2 can thus be kept constant during operation. As initially mentioned, a specific movement of the transport unit TE in the vertical direction (in this case in the Z-direction) can also take place, which can be achieved by appropriate control of the drive coils AS1, AS2.

The force component FSz of the levitation force FS normal to the transport plane 3, in this case in the Z-direction (see, e.g., FIG. 5b), can generally be applied both by the drive coils AS1 of the first coil group SG1 and by the drive coils AS2 of the second coil group SG2. The force component FSH1 of the levitation force FS in the first main direction of movement H1 (in this case, FSx in the X-direction) is generally only applied by the drive coils AS1 of the first coil group SG1 for an inclination of the transport segment 2 at an angle α about the Y-axis (for example, according to FIG. 5b). The same of course also applies to the case of an inclination (not shown) of the transport segment 2 at an angle of inclination β about the X-axis, for the force component FSH2 of the levitation force FS in the second main direction of movement H2 (in this case, FSy in the Y-direction). In this case, the force component FSH2 would generally only be applied by the drive coils AS2 of the second coil group SG2. With an inclination about both axes X, Y at the angles α, β, the levitation force FS with the force components FSH1, FSH2 (or in this case FSx, FSy) is shared by the drive coils AS1, AS2 according to the angle α, β. The same naturally also applies to an inclination with respect to the X-axis and/or the Y-axis, and an additional rotation of the transport segment 2 by an angle of rotation γ about the vertical axis, in this case the Z-axis.

In an asymmetrically designed transport segment 2 with a first main direction of movement H1 with an efficiency μH1 and a second main direction of movement H2 with a relatively lower efficiency μH2<μH1 (and/or with a higher maximum force in the first main direction of movement H1 relative to the second main direction of movement H2), in order to achieve an operation which is as efficient as possible, it is provided according to the invention that a force component of a loading force acting on the transport unit TE during operation of the transport device 1 is greater in the first main direction of movement H1 than a force component of the loading force FB in the second main direction of movement H2. The loading force at least includes the transport unit gravitational force FG of the transport unit TE.

However, the loading force FB can also include the process force FP, wherein the process force FP in turn can comprise an object weight force of an object O that can be transported with the transport unit TE and/or a work process force acting at least temporarily during a work process on the transport unit TE. For example, at least one process station (not shown) for carrying out a work process on the transport unit TE or on an object O that can be transported with the transport unit TE could be provided in the transport device 1, wherein a work process force can act as part of the process force FP at least temporarily while the work process is being carried out the transport unit TE. The work process force can of course act on the transport unit TE in any direction in space, whereas the object weight force acts in the direction of gravitation. It can therefore be advantageous for the transport segment 2 to be arranged relative to the process station in such a way that the loading force lies predominantly in the first main direction of movement H1. In general, the loading force corresponds to a vector sum of the process force FP and the gravitational force FG of the transport unit TE, with the process force FP containing the work process force and/or the object weight force.

Preferably, when the transport segment 2 is in a non-horizontal position, the inclination of the transport segment 2 is set such that the force component of the loading force FB in the first main direction of movement H1 is at least 5% greater than the force component of the loading force FB in the second main direction of movement H2, preferably at least 10% greater, more preferably at least 20% greater. For example, the inclination of the transport segment 2 can be set so that the first main direction of movement H1 is at an angle of 90°±45° to the horizontal, as shown for example in FIG. 5c, in which the transport segment 2 is tilted at an angle α=90° from the horizontal with respect to the Y-axis. The vectorial sum of the gravitational force FG of the transport unit TE and the process force FP, which corresponds to the loading force, acts vertically and thus 100% in the first main direction of movement H1.

The control unit 5 of the transport device (see FIG. 1a) is preferably configured to control the drive coils AS1 of the first coil group SG1 which interact with the drive magnets 4 of the transport unit TE in order to generate an electromagnetic force component in the first main direction of movement H1 that counteracts the force component of the loading force in the first main direction of movement H1, and to control the drive coils AS2 of the second coil group SG2 which interact with the drive magnets 4 of the transport unit TE in order to generate an electromagnetic force component in the second main direction of movement H2 that counteracts the force component of the loading force in the second main direction of movement H2.

In the illustrated examples according to FIG. 5a-FIG. 5e, the loading force (consisting of the weight force FG of the transport unit (FE) and the process force FP) only acts in the direction of gravitation. The transport segment 2 is therefore preferably arranged in a position deviating from the horizontal position in such a way that the force component FSH1 of the electromagnetically generated levitation force FS in the first main direction of movement H1 (FIGS. 5b-5e— force component FSx in the X-direction) is greater than the force component FSH2 of the levitation force FS in the second main direction of movement H2 (FIGS. 5d and 5e component FSy in the Y-direction; in FIGS. 5b and 5c, there is no force component FSH2 in the second main direction of movement H2 and/or FSy in the Y-direction, since the transport segment 2 is only tilted with respect to the Y-axis). Due to the advantageous orientation of the transport segment 2, the result is that the drive coils AS1 generate a greater proportion of the levitation force FS in the first main direction of movement H1 than the drive coils AS2 in the second main direction of movement H2, which means that, for a transport device 1 with an inclined (non-horizontal) installation configuration of the transport segment 2, a particularly efficient operation can be achieved.

In the examples shown, in which the process force FP, apart from the object weight force of the object O, does not contain any work process force acting externally on the transport unit TE, this means that the angle of inclination α with respect to the Y-axis and/or the angle of inclination α with respect to the X-axis and/or the angle of rotation γ about the Z-axis are set in such a manner that the direction of gravitation (in this case, the Z-direction) coincides as much as possible with the first main direction of movement H1 of the transport segment 2. The inclination (angle α, β, γ) of the transport segment 2 is advantageously set in such a way that the force component FSH1 of the levitation force FS in the first main direction of movement H1 is at least 5%, preferably at least 10%, particularly preferably at least 20% greater than the force component FSH2 of the levitation force FS in the second main direction of movement H1. The efficiency of the operation of the transport device 1 can thus increase at least up to a certain degree in proportion to how much greater the force component FSH1 of the levitation force FS in the first main direction of movement H1 is relative to the force component FSH2 of the levitation force FS in the second main direction of movement H2. If the levitation force FS lies completely in the first main direction of movement H1, this corresponds, for example, to the arrangement according to FIG. 5c, that is an inclination of the transport segment 2 at an angle of inclination α=90° only with respect to the Y-axis. However, the ohmic losses of the drive coils AS1, AS2, which occur during operation of the transport device 1 and which are proportional to the square of the electrical coil currents, must also be taken into account. If, for example, all or almost all of the levitation force FS is applied by the drive coils AS1 in the first main direction of movement H1 (such as in the arrangement according to FIG. 5c), then the coil currents in the drive coils AS1 are relatively high compared to the coil currents in the drive coils AS2 in the second main direction of movement H2. This can mean that although the loading force FB substantially acts entirely in the first main direction of movement H1, the efficiency of the transport device 1 cannot be increased, or can only be increased to a small extent, because the ohmic losses in the drive coils ASi increase disproportionately. For the most efficient possible operation of the transport device, it can therefore be advantageous to fix the inclination of the transport segment 2 in favor of the first main direction of movement H1, but only to a certain extent. From this it can be seen that the definition of an advantageous inclination of the transport segment 2 also depends on the specific structural configuration of the drive coils AS1, AS2. The specification of a specific inclination is therefore at the discretion of the person skilled in the art, depending on the application.

Figure 6:
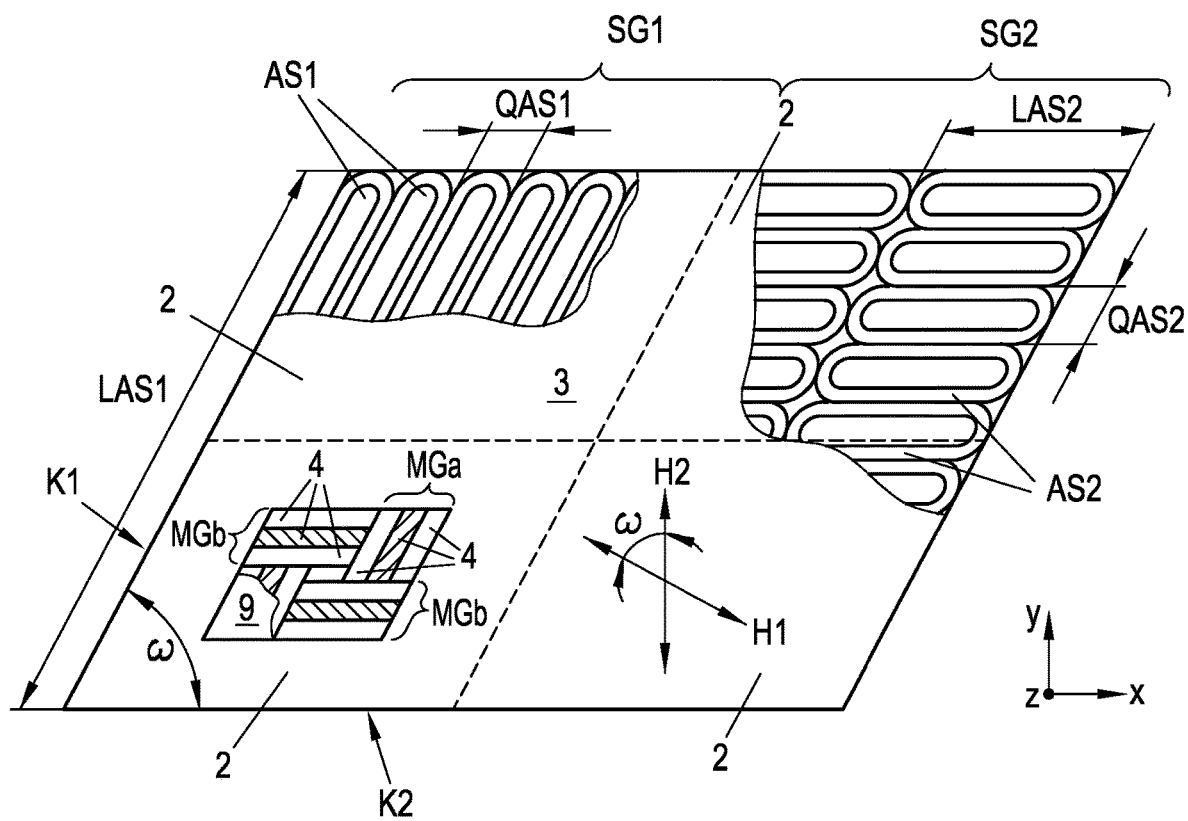
FIG. 6 shows a transport device in the form of a planar motor, in an alternative embodiment, in plan view.

A further advantageous embodiment of the transport device 1 is shown in FIG. 6 in a plan view of the transport plane 3. The transport device substantially corresponds to the embodiment according to FIG. 1a-1c and therefore only the essential differences are addressed at this point. The stator of the transport device 1 has a plurality of, in particular four, similar transport segments 2 which together form the transport plane 3 in which at least one transport unit TE is movable. However, in contrast to the embodiment according to FIG. 1a, the transport segments 2 are not designed to be rectangular, but each have the shape of a rhombus. In an analogous manner, the at least one transport unit TE is designed such that a surface of the transport unit TE projected onto the transport plane 3 is designed to be rhombic. Of course, the transport unit could also be designed to be rectangular, as has been described, e.g., with reference to FIG. 3a-4d. The first main movement direction H1 can, for example, be perpendicular to a first edge K1 of the rhombic transport plane 3 and the second main movement direction H2 can be perpendicular to the second edge K2 of the rhombic transport plane 3 adjoining the first edge K1. The transport segments 2 are each designed such that the first edge K1 and the second edge K2 are arranged at a rhombus angle ω<90° to one another in order to form the shape of a rhombus. Respective opposite sides run parallel, as shown in FIG. 6.

As already described in detail, the directions of the two main movement directions H1, H2 result from the arrangement of the drive coils AS1, AS2 of the coil groups SG1, SG2. Analogous to the example according to FIG. 1a, the drive coils AS1, AS2 of the first and second coil groups SG1, SG2 in the example shown are each designed as elongated coils with a longitudinal extension LAS1, LAS2 and a transverse extension QAS1, QAS2 perpendicular and relatively smaller thereto. In order to achieve different coil properties influencing the magnetic field, the drive coils AS1 of the first coil group SG1 can be closer to the transport plane 3 in the normal direction to the transport plane 3 (in this case in the Z-direction) than the drive coils AS2 of the second coil group SG2. The first main movement direction H1 thus runs orthogonally to the longitudinal extension LAS1 of the first drive coils AS1, in this case normal to the first edge K1 of the transport segments 2. The second main movement direction H2 runs orthogonally to the longitudinal extension LAS2 of the second drive coils AS2, in this case normal to the second edge K2 of the transport segments 2. In the example shown, the second main movement direction H2 consequently runs at a rhombus angle ω to the first main movement direction H1. The rhombus shape can advantageously be provided for the case when a desired angle between the main movement directions H1, H2 is less than 90°. This would be equally possible with a rectangular shape of the transport segment 2 (e.g., according to FIG. 1a) but for this purpose, the drive coils AS1, AS2 of at least one main movement direction H1, H2 would have to be arranged such that their longitudinal extension no longer runs parallel to the edge of the rectangular transport plane 3, which would be structurally more complex.

First magnet groups MGa and second magnet groups MGb, each with a plurality of drive magnets 4 of different magnetic orientation, are once again arranged on the transport unit TE. The drive magnets 4 can be arranged as shown in FIG. 6 in the form of a 1D arrangement with a plurality of elongated drive magnets 4 (see also FIG. 3a-3f). Of course, a 2D arrangement with a chessboard-like arrangement of drive magnets 4 would also be possible (see, e.g., FIG. 4a-4d). The 1D and 2D arrangement has already been described in detail and therefore no further details are provided at this point. In the example according to FIG. 10, the first magnet groups MGa are preferably arranged such that the longitudinal direction of the drive magnets 4 of the first magnet group MGa runs as normal as possible to the first main movement direction H1. Analogously, the second magnet groups MGb are preferably arranged such that the longitudinal direction of the drive magnets 4 of the second magnet groups MGb runs as normal as possible to the second main movement direction H2. Of course, the movement of the transport unit TE, in particular due to a rotation of the transport unit TE about the vertical axis (in this case the Z-axis), can in turn result in deviations which, e.g., can lead to a reduction in the efficiencies μH1, μH2 of the two main movement directions H1, H2, as has already been described with reference to FIG. 5e. However, if the magnet groups MGa, MGb have the same magnetic properties influencing the magnetic field, the assignment of the two main movement directions H1, H2 does not change.

The arrangement of the transport segments 2 according to the invention, which has already been described in detail, of course also applies to the example of an embodiment according to FIG. 6, which is why a detailed description is not included at this point. The stator consisting of the four transport segments 2 is therefore preferably arranged in a position that deviates from a horizontal position, such that a force component of the loading force FB acting on the transport unit TE during operation of the transport device 1 is greater in the first main direction of movement H1 than a force component of the loading force FB in the second main direction of movement H2. If the loading force FB includes, for example, only the gravitational force FG of the transport unit TE and, if applicable, the object weight force of a transported object O, the transport segments 2 in FIG. 6 could, for example, be arranged in such a way that the first main direction of movement H1 is at an angle of 90°±45° with respect to the horizontal. If the loading force also includes a work process force, another advantageous arrangement of the transport segments 2 can of course also be produced, according to the magnitude and direction of the work process force.

The invention claimed is:

1. Transport device in the form of a planar motor, the transport device comprising:
    a transport segment forming a transport plane and having a transport unit configured and arranged to move in the transport plane at least two-dimensionally along two main movement directions;
    a first coil group, which defines the first main movement direction and has first drive coils, is arranged on the transport segment;
    a second coil group, which defines the second main movement direction and has second drive coils is arranged on the transport segment;
    drive magnets are arranged on the at least one transport unit;
    a control unit configured and arranged to control
        the first drive coils of the first coil group in order to interact electromagnetically with at least some of the drive magnets (4) of the transport unit for moving the transport unit in the first main movement direction, and
        the second drive coils of the second coil group in order to interact electromagnetically with at least some of the drive magnets of the transport unit for moving the transport unit in the second main movement direction;
    wherein the transport unit is configured and arranged to move in the two main movement directions with a different efficiency and/or a different maximum force and/or a different accuracy, in that the first and second drive coils of the first and second coil groups have different coil properties influencing the magnetic field and/or the drive magnets of the transport unit interacting with the first drive coils of the first coil group have different magnetic properties influencing the magnetic field than the drive magnets interacting with the second drive coils of the second coil group;
    wherein the transport segment is arranged in a position that is different from a horizontal position, in such a way that a force component of a loading force acting on the transport unit, during operation of the transport device, is greater in the first main direction of movement than a force component of the loading force in the second main direction of movement, wherein the loading force at least includes the transport unit gravitational force of the at least one transport unit.

2. The transport device according to claim 1, wherein an inclination of the transport segment is set in such a way that the force component of the loading force in the first main direction of movement is at least 5% greater than the force component of the loading force in the second main direction of movement.

3. The transport device according to claim 1, wherein the loading force includes a process force acting at least temporarily on the one transport unit, the process force including an object gravitational force on an object that can be transported with the transport unit and/or a process force acting at least temporarily on the transport unit during a work process.

4. The transport device according to claim 3, further including a process station configured and arranged for carrying out a work process on the transport unit or on an object that can be transported with the transport unit,
   wherein a work process force acts at least temporarily on the transport unit during the work process as a portion of the process force.

5. The transport device according to claim 1, wherein the transport segment is rhombic in shape, in order to form a rhombic transport plane.

6. The transport device according to claim 5, wherein the first main direction of movement is normal to a first edge of the rhombic transport plane, and in that the second main direction of movement is normal to a second edge of the rhombic transport plane that adjoins the first edge.

7. The transport device according to claim 1, wherein the first and second drive coils of the coil groups have one or more of the following coil properties configured and arranged to influence the magnetic field: an average coil spacing in the normal direction from the drive magnets of the transport unit, and/or a conductor resistance, and/or a maximum coil current, and/or a number of windings, and/or a coil geometry;
   and/or wherein the magnetic properties of the drive magnets of the transport unit influencing the magnetic field comprise: a remanent flux density of the drive magnets, or
   a relative orientation between the drive magnets and the first and second drive coils of the coil groups, or
   a pole pitch of the drive magnets, or
   a magnetic geometry of the drive magnets.

8. The transport device according to claim 1, wherein the control unit is configured to
   control the first drive coils of the first coil group which interact with the drive magnets of the transport unit in order to generate a first electromagnetic force component in the first main direction of movement that counteracts the force component of the loading force in the first main direction of movement, and
   control the second drive coils of the second coil group which interact with the drive magnets of the transport unit in order to generate a second electromagnetic force component in the second main direction of movement that counteracts the force component of the loading force in the second main direction of movement.

9. The transport device according to claim 1, wherein the first and second drive coils of the first and second coil groups are each elongated coils with a longitudinal extension, and with a transverse extension that is normal thereto and is comparatively smaller relative to the longitudinal extension,
   wherein the first main direction of movement runs orthogonally to the longitudinal extension of the first drive coils, and the second main direction of movement runs orthogonally to the longitudinal extension of the second drive coils.

10. A method for operating a transport device in the form of a planar motor, the method including the following steps:
   providing a transport segment forming a transport plane,
   providing a transport unit movable in the transport plane at least two-dimensionally in two main movement directions,
   arranging a first coil group, which defines a first main movement direction of the two main movement directions and has a plurality of first drive coils, on the transport segment,
   arranging a second coil group, which defines a second main movement direction of the two main movement directions and has a plurality of second drive coils, on the transport segment, and
   arranging drive magnets on the transport unit,
   electromagnetic interaction between the first drive coils of the first coil group with at least part of the drive magnets moves the transport unit in the first main movement direction, and
   electromagnetic interaction between the second drive coils of the second coil group with at least part of the drive magnets move the transport unit in the second main movement direction,
   moving the transport unit in the two main movement directions with a different efficiency and/or a different maximum force and/or a different accuracy by providing the first drive coils of the first coil group and second drive coils of the second coil group with different coil properties influencing the magnetic field and/or by providing the drive magnets of the transport unit interacting with the first drive coils of the first coil group with different magnetic properties influencing the magnetic field than the drive magnets interacting with the second drive coils of the second coil group,
   arranging the transport segment in a position that is different from a horizontal position, such that a force component of a loading force acting on the transport unit is greater in the first main direction of movement than a force component of the loading force in the second main direction of movement, wherein the loading forces at least includes the transport unit gravitational force of the transport unit.

11. The method according to claim 10, further comprising;
   setting an inclination of the transport segment such that the force component of the loading force in the first main direction of movement is at least 5% greater than the force component of the loading force in the second main direction of movement.

12. The method according to claim 10, wherein the loading force includes a process force acting at least temporarily on the transport unit, the process force (FP) including an object gravitation force of an object transported with the transport unit and/or a process force acting at least temporarily on the transport unit during a work process.

13. The method according to claim 12, further including the steps of:
   moving the transport unit to an area of a process station, and
   carrying out a work process on the transport unit or on an object transported with the transport unit, wherein a work process force acts on the transport unit at least temporarily while the work process is carried out.

14. The method according to claim 10, further including the steps of:
   interaction of the first drive coils of the first coil group with the drive magnets of the transport unit in order to generate a first electromagnetic force component in the first main direction of movement that counteracts the force component of the loading force in the first main direction of movement, and
   interaction of the second drive coils of the second coil group with the drive magnets of the transport unit in order to generate a second electromagnetic force component in the second main direction of movement that counteracts the force component of the loading force in the second main direction of movement.

15. The transport device of claim 1, wherein an inclination of the transport segment is set in such a way that the force component of the loading force in the first main direction of movement is at least 10% greater than the force component of the loading force in the second main direction of movement.

16. The transport device of claim 1, wherein an inclination of the transport segment is set in such a way that the force component of the loading force in the first main direction of movement is at least 20% greater than the force component of the loading force in the second main direction of movement.

17. The method of claim 10, wherein an inclination of the transport segment is set in such a way that the force component of the loading force in the first main direction of movement is at least 10% greater than the force component of the loading force in the second main direction of movement.

18. The method of claim 10, wherein an inclination of the transport segment is set in such a way that the force component of the loading force in the first main direction of movement is at least 20% greater than the force component of the loading force in the second main direction of movement.

* * * * *